(12) United States Patent
Raymond

(10) Patent No.: US 8,769,776 B2
(45) Date of Patent: Jul. 8, 2014

(54) CABLE ADJUSTING DEVICE

(76) Inventor: Henry N. Raymond, South Lake Tahoe, CA (US)

( * ) Notice: Subject to any disclaimer, the term of this patent is extended or adjusted under 35 U.S.C. 154(b) by 245 days.

(21) Appl. No.: 13/445,491

(22) Filed: Apr. 12, 2012

(65) Prior Publication Data

US 2013/0091673 A1     Apr. 18, 2013

Related U.S. Application Data

(60) Provisional application No. 61/627,610, filed on Oct. 13, 2011.

(51) Int. Cl.
*F16G 11/00* (2006.01)
*F16B 2/06* (2006.01)
*F16B 45/00* (2006.01)
*F16G 11/10* (2006.01)
*F16G 11/14* (2006.01)

(52) U.S. Cl.
CPC ............ *F16G 11/106* (2013.01); *F16G 11/143* (2013.01)
USPC .............................. 24/130; 24/265 H; 24/369

(58) Field of Classification Search
CPC ....... F16G 11/10; F16G 11/04; F16G 11/044; F16G 11/046
USPC ............ 24/68 CD, 130, 373, 265 H, 265 CD, 24/265 R, 305, 370, 129 R
See application file for complete search history.

(56) References Cited

U.S. PATENT DOCUMENTS

| | | | | |
|---|---|---|---|---|
| 4,120,077 A | * | 10/1978 | Fink | 24/130 |
| 4,765,005 A | * | 8/1988 | Hippel | 5/648 |
| 6,012,204 A | | 1/2000 | Roethler | |
| 6,260,498 B1 | * | 7/2001 | Cochran | 114/218 |
| 6,269,523 B1 | * | 8/2001 | Benoit | 24/130 |
| D466,792 S | * | 12/2002 | Knopp | D8/356 |
| 7,428,769 B2 | | 9/2008 | Fontaine et al. | |
| 8,418,381 B2 | * | 4/2013 | Reagan et al. | 36/50.1 |
| 2008/0110000 A1 | * | 5/2008 | Orr | 24/130 |
| 2008/0307612 A1 | * | 12/2008 | Fontaine et al. | 24/130 |
| 2009/0031845 A1 | | 2/2009 | Kainzner | |
| 2012/0000043 A1 | * | 1/2012 | Maire | 24/68 CD |

OTHER PUBLICATIONS

PCT-International Search Report re PCT/US2013/036033, mailed Aug. 8, 2013.

* cited by examiner

*Primary Examiner* — Robert J Sandy
*Assistant Examiner* — Michael Lee
(74) *Attorney, Agent, or Firm* — Kali Law Group, P.C.

(57) ABSTRACT

Cable adjusting devices are presented including: a base plate; a pair of walls connected with the base plate along a top surface, where each of the pair of walls includes an outer surface and an inner surface, where the inner surfaces of the pair of walls form a v-groove, and where the inner surfaces include, a number of gripping ridge pairs, and a locking ridge pair disposed alongside one end of the number of gripping ridge pairs at the distal end of the base plate; a keeper bar extending between the pair of walls at the proximal end of the base plate; and an attachment point disposed along the bottom surface of the base plate along at least the distal end or the proximal end.

19 Claims, 3 Drawing Sheets

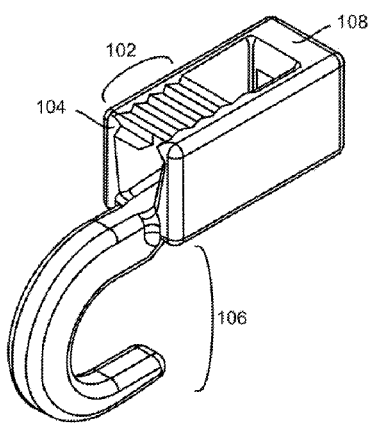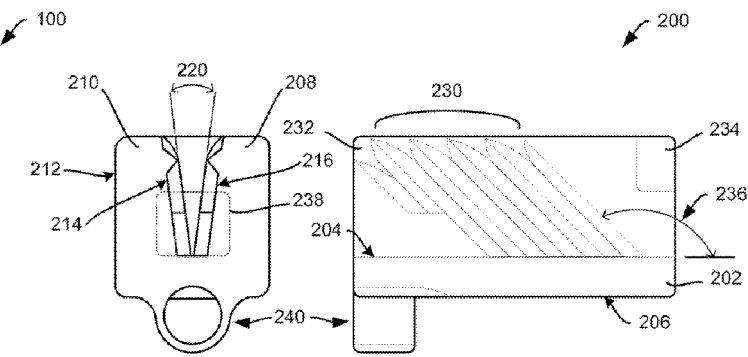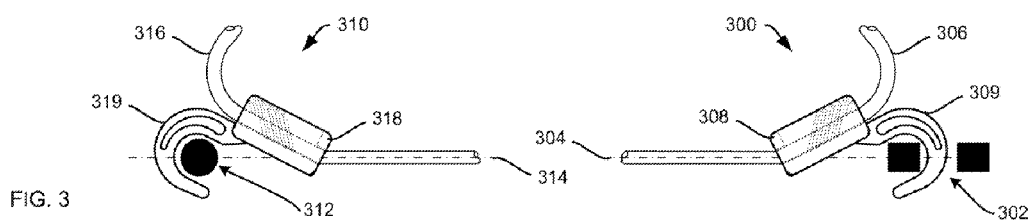

CABLE ADJUSTING DEVICE

PRIORITY CLAIM TO PROVISIONAL APPLICATION

A claim for priority is hereby made under the provisions of 35 U.S.C. §119 for the present application based upon U.S. Provisional Application No. 61/627,610 filed on Oct. 13, 2011 which is incorporated herein by reference.

FIELD OF INVENTION

Present embodiments relate generally with tie-down devices and more particularly to improved adjustable length tie-down devices that provide for securing objects such as cargo, tarps, and the like in a more efficient manner.

BACKGROUND

Safely securing cargo is particularly useful in a highly mobile society. In the trucking industry, for example, cargo securing devices run from simple ropes to complex ratcheting strap systems. In securing lighter cargo, braided cord or bungee cord is often utilized. Much to the consternation of non-professionals, lengths of cord purchased often do not match the user's immediate needs and thus require the user to cut purchased cord to a desired length. After the job, the user is often left with a pile of cords each having a different length that will be unsuitable for any but a specific task. As a result, much of the cord is then thrown away or wasted. In other examples, a user may utilize an assortment of bungee cords having different lengths to secure cargo, tarps, and the like. However, in many instances, an appropriately sized bungee cord is not available despite having such an assortment. In those instances, a user may attempt to shorten the length of a bungee cord by wrapping the bungee cord repeatedly around an anchor or some other wrap point. Wrapping the bungee in this way often results in an inadequately tensioned hook, which may result in inadvertently releasing the load or cargo being secured. In other instances, a user may attempt to overstretch the bungee cord to accommodate a desired length that may result in hook or bungee failure. In a worst case scenario, a failing bungee cord may "snap" violently causing injury to a user or damage to cargo.

While many attempts to resolve this problem have been proposed and tested, conventional solutions remain difficult to adjust and configure. As such, cable adjusting devices are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, cable adjusting devices are presented including: a base plate having a top surface, a bottom surface, a distal end and a proximal end; a pair of walls connected with the base plate along the top surface, where the pair of walls each extend away from the top surface and are disposed along opposite edges of the base plate, where each of the pair of walls includes an outer surface and an inner surface, where the inner surfaces of the pair of walls form a v-groove, and where the inner surfaces include, a number of gripping ridge pairs, where the gripping ridge pairs extend from the top surface of the base plate toward the distal end of the base plate at a rake angle with respect to the base plate, and a locking ridge pair disposed alongside one end of the number of gripping ridge pairs at the distal end of the base plate; a keeper bar extending between the pair of walls at the proximal end of the base plate, the keeper bar connecting the pair of walls such that an opening is formed between the keeper bar and the top surface of the base plate; and an attachment point disposed along the bottom surface of the base plate the distal end or the proximal end or both. In some embodiments, the v-groove forms an angle in a range of 10 to 30 degrees. In some embodiments, the v-groove includes a space at the base plate in a range of 0 to 0.25 inches. In some embodiments, the rake angle is in a range of 120 to 150 degrees. In some embodiments, the attachment point includes: a hook structure, a ring structure, a threaded structure, a loop structure, a pulley structure, a clamp structure, a clasp structure, a fastener structure, a carabiner structure, a hole structure, and an over-mold structure that retains a distal end of a cable. In some embodiments, the hook structure includes a cross-section profile selected from the group consisting of a raised edge profile, a squared I-profile, a semi-arcuate I-profile, an arcuate profile, a semi-arcuate profile, a squared profile, a rounded edge profile, an ovate profile, a semi-ovate profile, an embedded rod profile, and a circular profile. In some embodiments, the keeper bar further includes an embedded support rod, and where the keeper bar includes at least one rounded edge such that a cable slidingly engages the keeper bar. In some embodiments, the keeper bar further includes a rotating wheel assembly for slidingly engaging the cable, where a portion of the keeper bar forms an axle for the rotating wheel assembly. In some embodiments, the cable is selected from the group consisting of: a non-elastic cable, a non-elastic rope, a non-elastic cord, an elastic cable, an elastic rope, an elastic cord, a natural fiber cable, a natural fiber rope, a natural fiber cord, a polymeric compound cable, polymeric compound rope, a polymeric compound cord, a blended cable, a blended rope, a blended cord, a sheathed cable, a sheathed rope and a sheathed cord.

In other embodiments, cable adjusting devices are presented including: a cable having a proximal end and a distal end; a base plate having a top surface, a bottom surface, a distal end and a proximal end; a pair of walls connected with the base plate along the top surface, where the pair of walls each extend away from the top surface and are disposed along opposite edges of the base plate, where each of the pair of walls includes an outer surface and an inner surface, where the inner surfaces include, a number of gripping ridge pairs for gripping the cable, where the gripping ridge pairs extend from the top surface of the base plate toward the distal end of the base plate at a rake angle with respect to the base plate, and a locking ridge pair disposed alongside one end of the number of gripping ridge pairs at the distal end of the base plate for locking the cable in a desired position, where the inner surfaces of the pair of walls form a v-groove; a keeper bar extending between the pair of walls at the proximal end of the base plate, the keeper bar connecting the pair of walls such that an opening is formed between the keeper bar and the top surface of the base plate, the opening configured to receive the proximal end of the cable; and an attachment point disposed along the bottom surface of the base plate along at least the distal end or the proximal end of the base plate.

In other embodiments, methods of utilizing a cable adjusting device are presented including: receiving a first end of a cable into the cable adjusting device, where the cable adjusting device includes, a base plate having a top surface, a bottom surface, a distal end and a proximal end, a pair of walls connected with the base plate along the top surface, where the pair of walls each extend away from the top surface and are disposed along opposite edges of the base plate, where each of the pair of walls includes an outer surface and an inner surface, where the inner surfaces include, a number of gripping ridge pairs for gripping the cable, where the gripping ridge pairs extend from the top surface of the base plate toward the distal end of the base plate at a rake angle with respect to the base plate, and at least one locking ridge pair disposed alongside one end of the number of gripping ridge pairs at the distal end of the base plate for locking the cable in a desired position, where the inner surfaces of the pair of walls form a v-groove, a keeper bar extending between the pair of walls at the proximal end of the base plate, the keeper bar connecting the pair of walls such that an opening is formed between the keeper bar and the top surface of the base plate, the opening configured to receive the cable, and an attachment point disposed along the bottom surface of the base plate along at least the distal end; attaching the cable adjusting device to a first anchor point; tensioning the cable by drawing the cable through the opening; and temporarily securing the cable by pulling the cable into the v-groove across the gripping ridge pairs. In some embodiments, methods further include securing the cable by pulling the cable into an under space below the at least one locking ridge pair.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a perspective view of a cable adjusting device in accordance with embodiments of the present invention;

FIG. 2 is an illustrative representation of a cable adjusting device in accordance with embodiments of the present invention;

FIG. 3 is an illustrative representation of a cable adjusting device in use in accordance with embodiments of the present invention;

DETAILED DESCRIPTION

Figure 4:
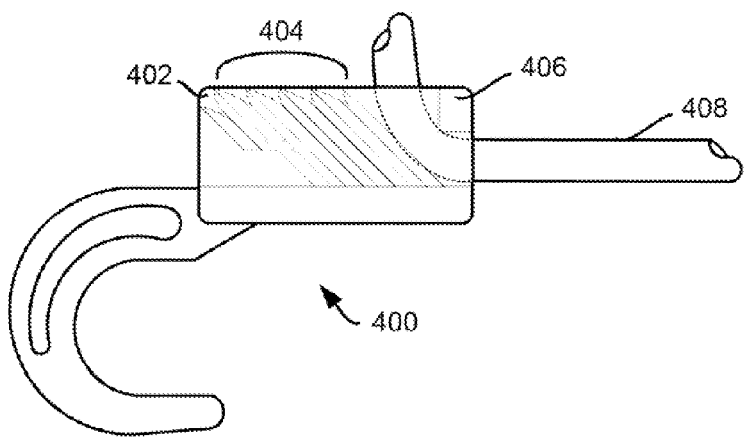
FIG. 4 is an illustrative representation of a cable adjusting device in operation in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

FIG. 1 is a perspective view of cable adjusting device 100 in accordance with embodiments of the present invention. Embodiments described herein may be utilized as a tie-down device that provides adjustable cable length. Such embodiments may provide faster and easier method for adjusting cable tension whether loaded or unloaded. As utilized herein, the term "cable" is synonymous with any number of types and configurations of cables, ropes and cords without limitation and without departing from embodiments provided herein. Indeed, embodiments include cables such as: a non-elastic cable, a non-elastic rope, a non-elastic cord, an elastic cable, an elastic rope, an elastic cord, a natural fiber cable, a natural fiber rope, a natural fiber cord, a polymeric compound cable, polymeric compound rope, a polymeric compound cord, a blended cable, a blended rope, a blended cord, a sheathed cable, a sheathed rope and a sheathed cord. As illustrated, cable adjusting device 100 includes a number of features including a number of gripping ridge pairs 102, a locking ridge pair 104, an attachment point 106, and a keeper bar 108. Utilized in combination, attachment point 106 (in this example a hook structure) may be attached at a selected anchor point. In some examples, an anchor point may include a fixed object. In other examples, an anchor point may include a moveable object. Any number of attachment points may be utilized in embodiments provided herein such as, for example, a hook structure, a ring structure, a threaded structure, a loop structure, a pulley structure, a clamp structure, a clasp structure, a fastener structure, and an over-mold structure that retains a distal end of a cable.

Once cable adjusting device 100 is attached with an anchor point, a cable may be inserted into the device by passing under keeper bar 108. In embodiments, keeper bars may provide any number of functions including: holding a cable in the gripping ridge pairs when the cable adjusting device is under tension; retaining a cable in the gripping ridge pairs after tension is released to maintain a desired cable length; retaining a cable when a cable stop is utilized at a proximal end of the cable; and keeping a cable under tension before gripping ridge pairs are engaged. In some embodiments, keeper bars may include an embedded support rod (not shown), and may further include a rounded edge that slidingly engages a cable. Still further, in some embodiments, keeper bars may further include a rotating wheel assembly (not shown) for slidingly engaging the cable, where a portion of the keeper bar forms an axle for the rotating wheel assembly. In still other embodiments cable stops may include any arrangement sufficiently sized to prevent passage of a cable past the keeper bar such as, for example: a knot, a press fit ferrule, a crimp sleeve, a hog ring, a staple, a ring, and a ball stop.

After a cable is passed under keeper bar 108, gripping ridge pairs 102 may provide a gripping structure for a tensioned cable. Thus, when an appropriate tension is achieved, the cable may be pulled across the gripping ridge pairs, which pairs are configured to bite the cable. Once the cable is secured by gripping ridge pairs 102, the cable may then be pulled across and under locking ridge pair 104 to lock the cable in place. Methods of utilizing cable adjusting devices will be discussed in further detail below for FIGS. 3-7.

FIG. 2 is an illustrative representation of cable adjusting device 200 in accordance with embodiments of the present invention. In particular, FIG. 2 presents a side and front views of cable adjusting device 200. As illustrated, cable adjusting device 200 includes base plate 202 having a top surface 204 and a bottom surface 206. Walls 208 and 210 each extend away from top surface 204 and are disposed along opposite edges of the base plate 202. Each of the pair of walls includes, for example, outer surface 212 and inner surface 214. Further as illustrated, wall inner surfaces 214 and 216 form a v-groove 220, which v-groove forms an angle in a range of 10 to 30 degrees in some embodiments. In some embodiments, v-grooves further include a space at the base plate in a range of up to 0.25 inches. Importantly, the space at the base plate must be significantly smaller than the diameter of any cable being adjusted since too large a space may allow cable to slide freely in the v-groove without being engaged by gripping ridge pairs.

Further illustrated are gripping ridge pairs 230. As illustrated, four gripping ridge pairs are utilized; however, any number of gripping ridge pairs may be utilized without departing from embodiments disclosed herein. Further as illustrated, gripping ridges pairs 230 extend from top surface 204 of base plate 202 toward the distal end of base plate 202 at a rake angle 236 with respect to base plate 202. In embodiments, the rake angle is in a range of 120 to 150 degrees. As may be appreciated, by disposing gripping ridge pairs at a rake angle as disclosed herein, a cable may be freely pulled in the direction of the gripping ridge pairs and secured when engaged with the gripping ridge pairs. In addition, as tension is increased on a cable, the cable may be pulled deeper into the gripping ridge pairs thus providing more gripping force on the cable. It may be appreciated that the cross-sectional ridge shape of the gripping ridge pairs may be variable without departing from embodiments disclosed herein. In embodiments, cross-sectional ridge shapes should be pronounced enough to bite a selected cable. In some embodiments, gripping ridge pairs may be composed of any material sufficiently strong enough to withstand cable loads and conditions.

Further illustrated is locking ridge pair 232. As illustrated, one locking ridge pair is utilized; however, any number of locking ridge pairs may be utilized without departing from embodiments disclosed herein. Further as illustrated, locking ridge pair 232 may be disposed alongside one end of gripping ridge pairs 230 along at least the distal end (or proximal end) of base plate 202. As may be noted, locking ridge pair is shorter than gripping ridge pairs thereby creating a space where a cable may be retained when in a locked position. In some embodiments, the space created is at least matched with the diameter of a selected cable. By matching the space with the selected cable, the cable may slide more easily under the locking ridge pair during adjustments. In turn, once a cable is engaged with the locking ridge pair, pulling the cable out is relatively more difficult.

It may be appreciated that the cross-sectional ridge shape of locking ridge pairs be variable without departing from embodiments disclosed herein. Indeed, cross-sectional ridge shapes of locking ridge pairs need not be similar to cross-sectional ridge shapes of gripping ridge pairs in embodiments disclosed herein. Furthermore, while the locking ridge pairs illustrated are matched with the gripping ridge pairs with respect to angle and spacing, in some embodiments, locking ridge pairs may differ from gripping ridge pairs either in angle, spacing, or both angle and spacing without limitation. Still further, as illustrated, locking ridge pair includes a bottom edge that is sharply defined. However, any bottom edge definition may be utilized without departing from embodiments disclosed herein. Additionally, in some embodiments, locking ridge pairs may be composed of any material sufficiently strong enough to withstand cable loads and conditions.

Further illustrated is keeper bar 234. As noted above, keeper bars may provide any number of functions including: holding a cable in the gripping ridge pairs when the cable adjusting device is under tension; retaining a cable in the gripping ridge pairs after tension is released to maintain a desired cable length; retaining a cable when a cable stop is utilized at a proximal end of the cable; and keeping a cable under tension before gripping ridge pairs are engaged. In some embodiments, keeper bars may include an embedded support rod (not shown), and may further include a rounded edge that slidingly engages a cable. Still further, in some embodiments, keeper bars may further include a rotating wheel assembly (not shown) for slidingly engaging the cable, where a portion of the keeper bar forms an axle for the rotating wheel assembly. In still other embodiments cable stops may include any arrangement sufficiently sized to prevent passage of a cable past the keeper bar such as, for example: a knot, a press fit ferrule, a crimp sleeve, a hog ring, a staple, a ring, and a ball stop. As illustrated here, keeper bar 234 extends between pair of walls 208 and 210 at the proximal end of base plate 202. Keeper bar 234 connects pair of walls 208 and 210 such that opening 238 is formed between keeper bar 234 and top surface 204 of base plate 202 where the opening is configured to receive a proximal end of a cable.

Figure 8:
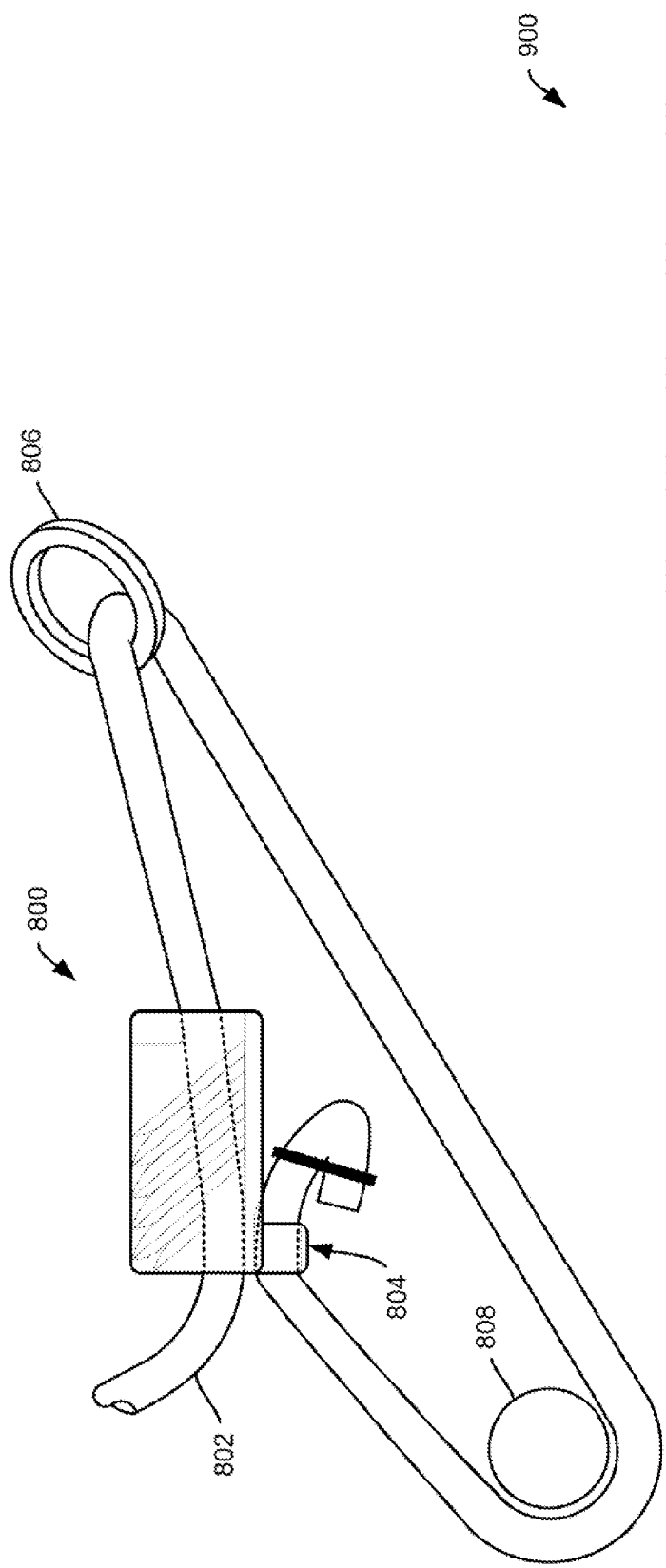
FIG. 8 is an illustrative representation of a cable adjusting device in use in accordance with embodiments of the present invention.

Further illustrated is attachment point 240 disposed along bottom surface 206 of base plate 202 along the distal end or the proximal end or both of base plate 202. In embodiments, attachment point 240 (in this example a ring structure) may be attached at a selected anchor point or may be attached with a cable such as illustrated in FIG. 8. In some examples, an anchor point may include a fixed object. In other examples, an anchor point may include a moveable object. Any number of attachment points may be utilized in embodiments provided herein such as, for example, a hook structure, a ring structure, a threaded structure, a loop structure, a pulley structure, a clamp structure, a clasp structure, a fastener structure, a carabiner structure, a hole structure, and an over-mold structure that retains a distal end of a cable.

FIG. 3 is an illustrative representation of cable adjusting devices 300 and 310 in use in accordance with embodiments of the present invention. In particular, cable adjusting device 300 includes hook 309 inserted through hole 302. When under tension, cable end 306 is loaded along center line 304. It may be noted that keeper bar 308 serves to keep cable 306 properly aligned along centerline 304 and with cable adjusting device 300 thus insuring that cable 306 remains suitably locked in place. Similarly, cable adjusting device 310 includes hook 319 attached at pipe 312. When under tension, cable end 316 is loaded along center line 314. It may be noted that keeper bar 318 serves to keep cable 316 properly aligned along centerline 314 and with cable adjusting device 310 thus insuring that cable 316 remains suitably locked in place. It may be appreciated that centerlines 304 and 314 need not be co-axial as illustrated, but may align based on any obstructions or contact points without departing from embodiments disclosed herein.

FIG. 4 is an illustrative representation of cable adjusting device 400 in operation in accordance with embodiments of the present invention. In particular, FIG. 4 is a side view of cable adjusting device 400 having cable 408 passing there within. Cable 408 is in a "loose" adjusting position passing under keeper bar 406 and not engaging gripping ridge pairs 404 or locking ridge pair 402.

Figure 5:
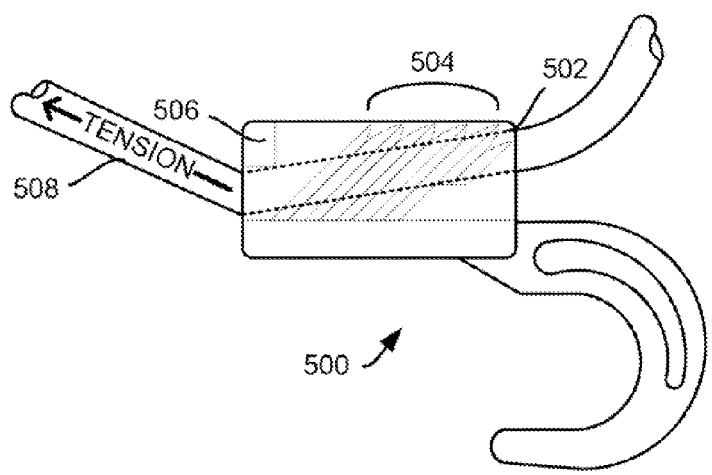
FIG. 5 is an illustrative representation of a cable adjusting device in operation in accordance with embodiments of the present invention.

FIG. 5 is an illustrative representation of cable adjusting device 500 in operation in accordance with embodiments of the present invention. In particular, FIG. 5 is a side view of cable adjusting device 500 having cable 508 passing there within. Cable 508 is under tension and is engaged with gripping ridge pairs 504, but is not engaged with locking ridge pair 502. In addition, keeper bar 506 functions to retain cable 508 in gripping ridge pairs 504.

Figure 6:
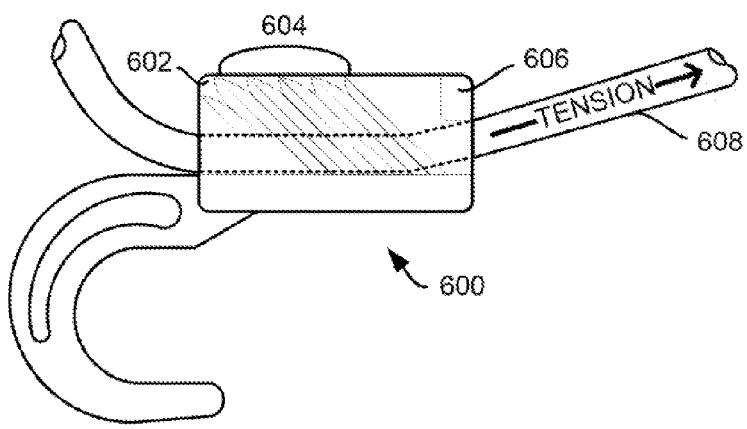
FIG. 6 is an illustrative representation of a cable adjusting device in operation in accordance with embodiments of the present invention.

FIG. 6 is an illustrative representation of a cable adjusting device 600 in operation in accordance with embodiments of the present invention. In particular, FIG. 6 is a side view of cable adjusting device 600 having cable 608 passing there within. Cable 608 is under tension and is engaged with gripping ridge pairs 604 and with locking ridge pair 602. In addition, keeper bar 606 functions to retain cable 608 in gripping ridge pairs 604.

Figure 7:
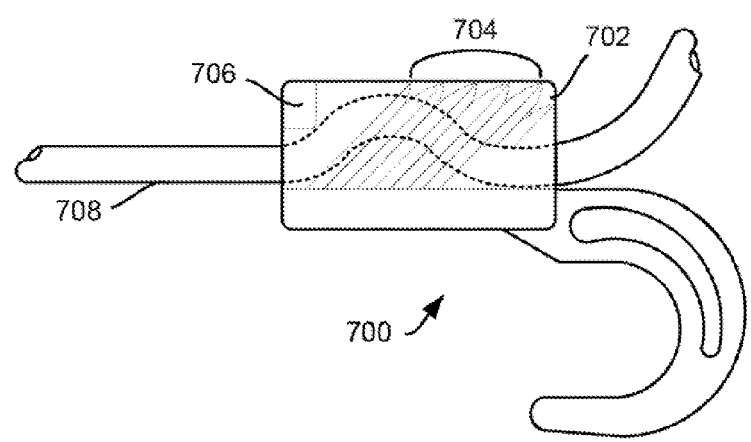
FIG. 7 is an illustrative representation of a cable adjusting device in operation in accordance with embodiments of the present invention.

FIG. 7 is an illustrative representation of cable adjusting device 700 in operation in accordance with embodiments of the present invention. In particular, FIG. 7 is a side view of cable adjusting device 700 having cable 708 passing there within. Cable 708 is not under tension and passes under keeper bar 706, but continues to be locked in place by partially engaging gripping ridge pairs 704 and fully engaging locking ridge pair 702. Embodiments in this position often occur when the cable is moved or removed from an anchor point.

With reference to FIGS. 3-6, methods of utilizing a cable adjusting device may include receiving a first end of a cable (408; FIG. 4) into a cable adjusting device (400; FIG. 4); attaching a cable adjusting device (300 and 310; FIG. 3) to a first anchor point (312 or 302; FIG. 3); tensioning a cable (508; FIG. 5) by drawing the cable (508; FIG. 5) through an opening created by a keeper bar (506; FIG. 5) and temporarily securing the cable (508; FIG. 5) by pulling the cable (508; FIG. 5) into a v-groove across the gripping ridge pairs (504; FIG. 5). In addition, methods may further include securing the cable (608; FIG. 6) by pulling the cable (608; FIG. 6) into the under space below the at least one locking ridge pair (602; FIG. 6). In embodiments, methods may further include unlocking the cable by pulling the cable and lifting the cable out of at least one locking ridge pair; de-tensioning the cable by pulling the cable and lifting the cable out of the plurality of gripping ridge pairs; and releasing the cable through the opening created by a keeper bar.

FIG. 8 is an illustrative representation of cable adjusting device 800 in use in accordance with embodiments of the present invention. In particular, FIG. 8 illustrates utilizing a single cable with a cable adjusting device embodiment. As illustrated, cable adjusting device includes ring structure 804 for retaining a distal end of cable 802. Cable 802 is then routed around anchor point 808, through anchor point 806, and into cable adjusting device 800. It may be appreciated that although only two example anchor points are illustrated, any number of anchor points having any number of configurations may be utilized without departing from embodiments of the present invention. It may be further appreciated that embodiments as illustrated may be desirable in block and tackle configurations without limitation.

Figure 9:
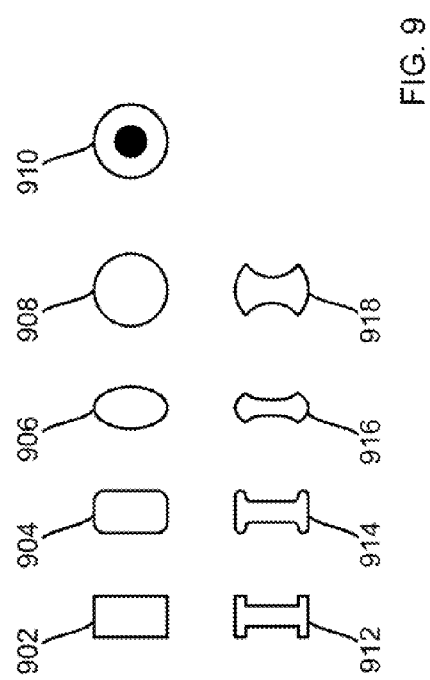
FIG. 9 is an illustrative representation of hook profiles for a cable adjusting device in accordance with embodiments of the present invention.

FIG. 9 is an illustrative representation of hook profiles 900 for a cable adjusting device in accordance with embodiments of the present invention. It may be appreciated that a selected hook profile may provide additional strength attributes to a hook embodiment. These embodiments are particularly useful when utilizing light weight materials in the manufacture of hooks. As such, any number of profiles may be utilized without limitation in embodiments such as, for example: a raised edge profile 914, a squared I-profile 912, a semi-arcuate I-profile 916 and 918, an arcuate profile (not shown), a semi-arcuate profile (not shown), a squared profile 902, a rounded edge profile 904, an ovate profile 906, a semi-ovate profile (not shown), and a circular profile 908. In addition, in some embodiments, an embedded rod profile 910 may be utilized. In an embedded rod profile, a metal rod or analogously strong material may be embedded into hook embodiments to provide additional strength characteristics.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following claims be interpreted as including all such alterations, permutations, and equivalents as fall within the true spirit and scope of the present invention.

What is claimed is:

1. A cable adjusting device comprising:
a base plate having a top surface, a bottom surface, a distal end and a proximal end;
a pair of walls connected with the base plate along the top surface, wherein
the pair of walls each extend away from the top surface and are disposed along opposite edges of the base plate, wherein
each of the pair of walls includes an outer surface and an inner surface, wherein the inner surfaces of the pair of walls form a v-groove, and wherein the inner surfaces include,
a plurality of gripping ridge pairs, wherein the gripping ridge pairs extend from the top surface of the base plate toward the distal end of the base plate at a rake angle with respect to the base plate, and
a locking ridge pair disposed alongside one end of the plurality of gripping ridge pairs at the distal end of the base plate, wherein the locking ridge pair partially extends proximal with the top surface of the base plate toward the distal end of the base plate thereby creating a space between the locking ridge pair and the base plate;
a keeper bar extending between the pair of walls at the proximal end of the base plate, the keeper bar connecting the pair of walls such that an opening is formed between the keeper bar and the top surface of the base plate; and
an attachment point disposed along the bottom surface of the base plate along at least the distal end or the proximal end.

2. The device of claim 1, wherein the v-groove forms an angle in a range of 10 to 30 degrees.

3. The device of claim 2, wherein the v-groove includes a space at the base plate in a range of 0 to 0.25 inches.

4. The device of claim 1, wherein the rake angle is in a range of 120 to 150 degrees.

5. The device of claim 1, wherein the attachment point is a structure selected from the group consisting of: a hook structure, a ring structure, a threaded structure, a loop structure, a pulley structure, a clamp structure, a clasp structure, a fastener structure, a carabiner structure, a hole structure, and an over-mold structure that retains a distal end of a cable.

6. The device of claim 5, wherein the hook structure includes a cross-section profile selected from the group consisting of: a raised edge profile, a squared I-profile, a semi-arcuate I-profile, an arcuate profile, a semi-arcuate profile, a squared profile, a rounded edge profile, an ovate profile, a semi-ovate profile, an embedded rod profile, and a circular profile.

7. The device of claim 1, wherein the keeper bar further comprises an embedded support rod, and wherein the keeper bar includes at least one rounded edge such that a cable slidingly engages the keeper bar.

8. The device of claim 1, wherein the keeper bar further includes a rotating wheel assembly for slidingly engaging the cable, wherein a portion of the keeper bar forms an axle for the rotating wheel assembly.

9. The device of claim 1, wherein the cable is selected from the group consisting of: a non-elastic cable, a non-elastic rope, a non-elastic cord, an elastic cable, an elastic rope, an elastic cord, a natural fiber cable, a natural fiber rope, a natural fiber cord, a polymeric compound cable, polymeric compound rope, a polymeric compound cord, a blended cable, a blended rope, a blended cord, a sheathed cable, a sheathed rope and a sheathed cord.

10. A cable adjusting device comprising:
a cable having a proximal end and a distal end;
a base plate having a top surface, a bottom surface, a distal end and a proximal end;
a pair of walls connected with the base plate along the top surface, wherein
the pair of walls each extend away from the top surface and are disposed along opposite edges of the base plate, wherein
each of the pair of walls includes an outer surface and an inner surface, wherein the inner surfaces include,
a plurality of gripping ridge pairs for gripping the cable, wherein the gripping ridge pairs extend from the top surface of the base plate toward the distal end of the base plate at a rake angle with respect to the base plate, and
a locking ridge pair disposed alongside one end of the plurality of gripping ridge pairs at the distal end of the base plate for locking the cable in a desired position, wherein the inner surfaces of the pair of walls form a v-groove and wherein the locking ridge pair partially extends proximal with the top surface of the base plate toward the distal end of the base plate thereby creating a space between the locking ridge pair and the base plate;
a keeper bar extending between the pair of walls at the proximal end of the base plate, the keeper bar connecting the pair of walls such that an opening is formed between the keeper bar and the top surface of the base plate, the opening configured to receive the proximal end of the cable; and
an attachment point disposed along the bottom surface of the base plate along at least the distal end or the proximal and of the base plate.

11. The device of claim 10, wherein the v-groove forms an angle in a range of 10 to 30 degrees.

12. The device of claim 11, wherein the v-groove includes a space at the base plate in a range of 0 to 0.25 inches.

13. The device of claim 10, wherein the rake angle is in a range of 120 to 150 degrees.

14. The device of claim 10, wherein the attachment point is a structure selected from the group consisting of: a hook structure, a ring structure, a threaded structure, a loop structure, a pulley structure, a clamp structure, a clasp structure, a fastener structure, a carabiner structure, a hole structure, and an over-mold structure that retains a distal end of a cable.

15. The device of claim 10, wherein the cable is selected from the group consisting of: a non-elastic cable, a non-elastic rope, a non-elastic cord, an elastic cable, an elastic rope, an elastic cord, a natural fiber cable, a natural fiber rope, a natural fiber cord, a polymeric compound cable, polymeric compound rope, a polymeric compound cord, a blended cable, a blended rope, a blended cord, a sheathed cable, a sheathed rope and a sheathed cord.

16. The device of claim 10, wherein the proximal end of the cable further includes a cable stop to prevent the cable from passing the keeper bar, wherein the cable stop is selected from the group consisting of: a knot, a press fit ferrule, a crimp sleeve, a hog ring, a staple, a ring, and a ball stop.

17. A method of utilizing a cable adjusting device comprising:
receiving a first end of a cable into the cable adjusting device, wherein the cable adjusting device includes,
a base plate having a top surface, a bottom surface, a distal end and a proximal end,
a pair of walls connected with the base plate along the top surface, wherein
the pair of walls each extend away from the top surface and are disposed along opposite edges of the base plate, wherein
each of the pair of walls includes an outer surface and an inner surface, wherein
the inner surfaces include,
a plurality of gripping ridge pairs for gripping the cable, wherein the gripping ridge pairs extend from the top surface of the base plate toward the distal end of the base plate at a rake angle with respect to the base plate, and
at least one locking ridge pair disposed alongside one end of the plurality of gripping ridge pairs at the distal end of the base plate for locking the cable in a desired position, wherein the inner surfaces of the pair of walls form a v-groove and wherein the locking ridge pair partially extends proximal with the top surface of the base plate toward the distal end of the base plate thereby creating a space between the locking ridge pair and the base plate,
a keeper bar extending between the pair of walls at the proximal end of the base plate, the keeper bar connecting the pair of walls such that an opening is formed between the keeper bar and the top surface of the base plate, the opening configured to receive the cable, and
an attachment point disposed along the bottom surface of the base plate along at least the distal end or the proximal end;
attaching the cable adjusting device to a first anchor point;
tensioning the cable by drawing the cable through the opening; and
temporarily securing the cable by pulling the cable into the v-groove across the gripping ridge pairs.

18. The method of claim 17 further comprising: securing the cable by pulling the cable into the space between the locking ridge pair and the base plate.

19. The method of claim 18 further comprising:
unlocking the cable by pulling the cable and lifting the cable out of the at least one locking ridge pair;
de-tensioning the cable by pulling the cable and lifting the cable out of the plurality of gripping ridge pairs; and
releasing the cable through the opening.

* * * * *